Dec. 28, 1954   A. G. RINDFLEISCH   2,697,981
CHECK WRITING MACHINE
Filed Aug. 30, 1950   9 Sheets-Sheet 1

Inventor:
Arthur G. Rindfleisch
By: Brown, Jackson, Boettcher & Dienner.
Attys.

Inventor:
Arthur G. Rindfleisch
By: Brown, Jackson, Boettcher & Dienner
Attys.

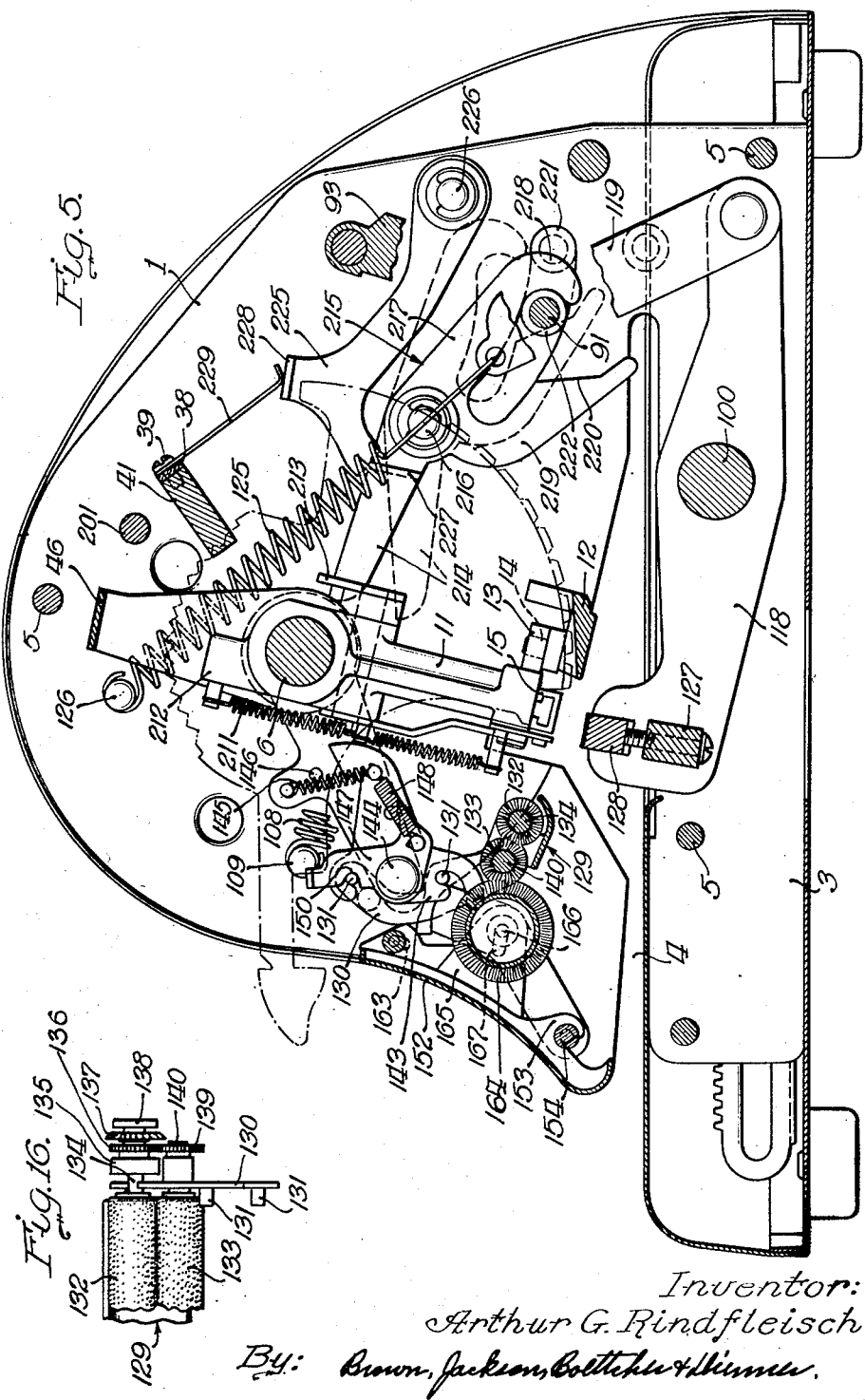

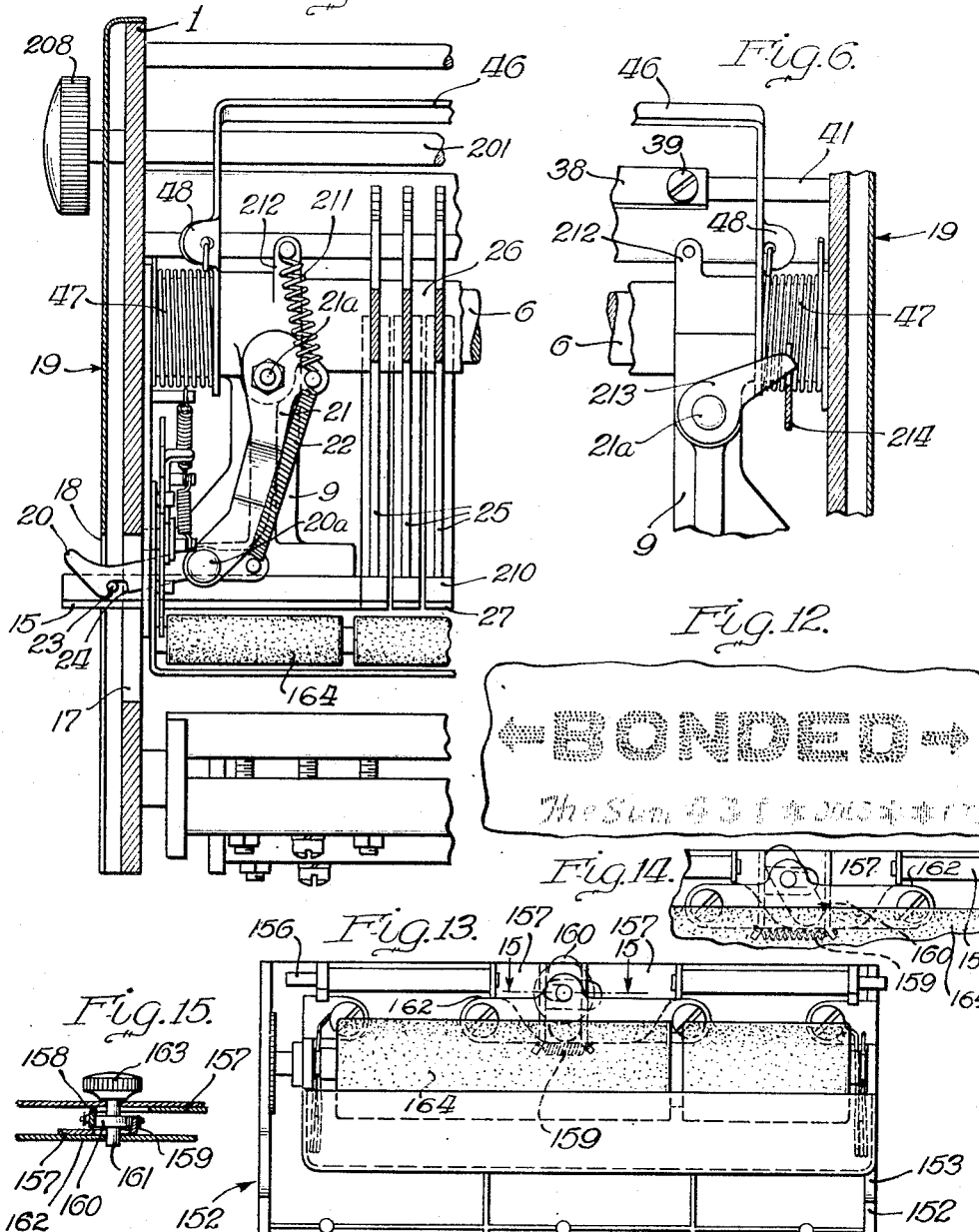

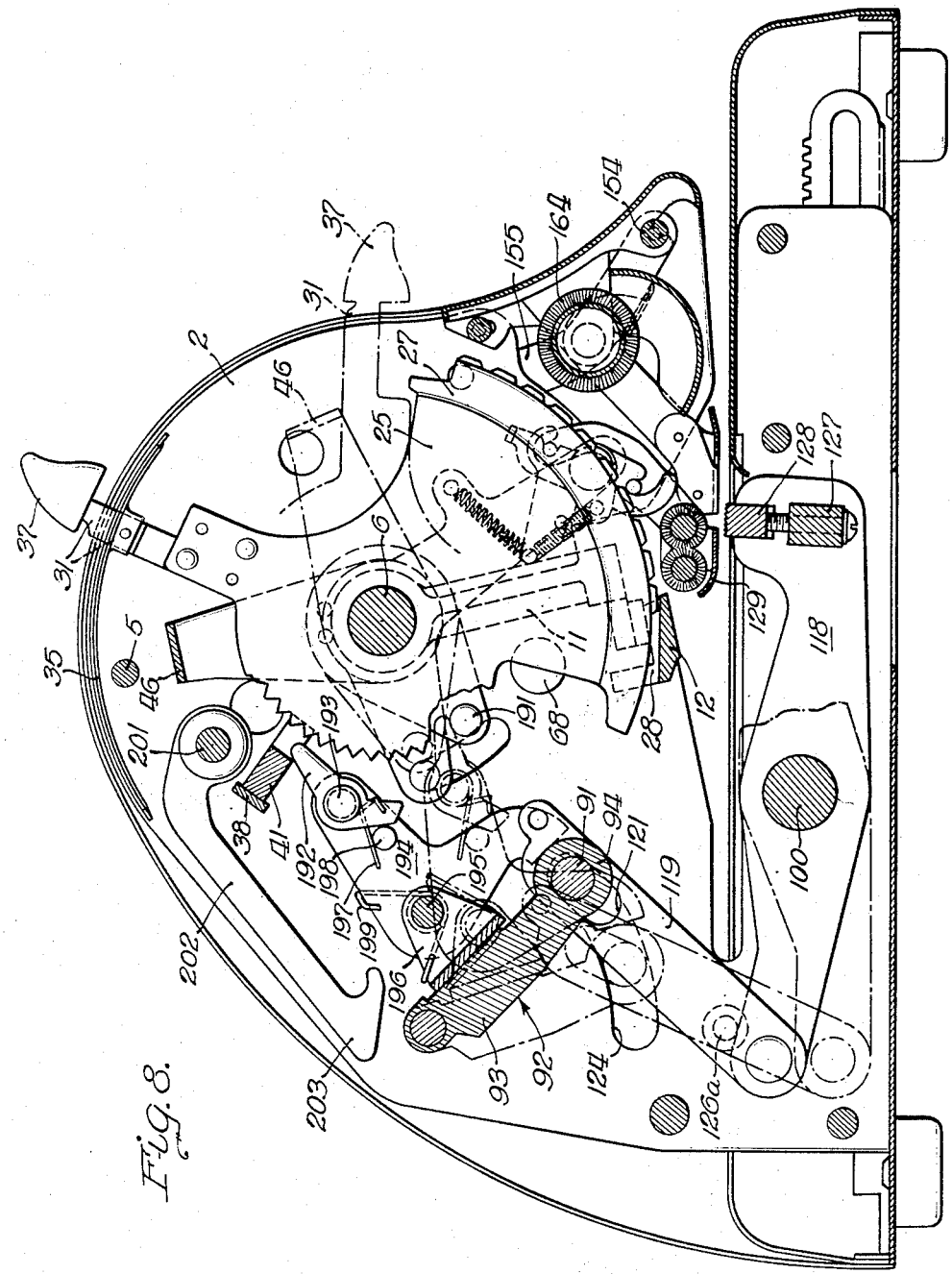

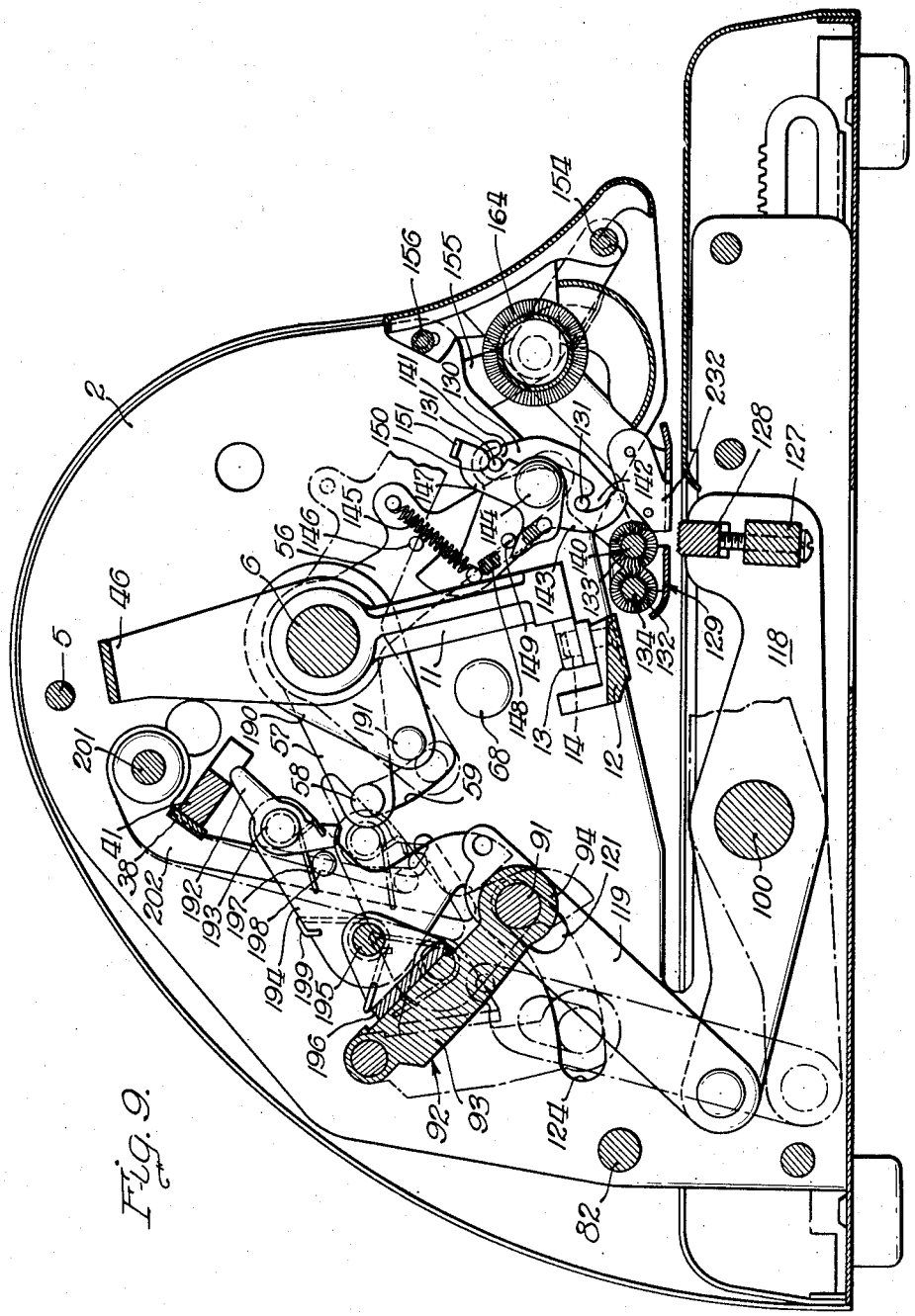

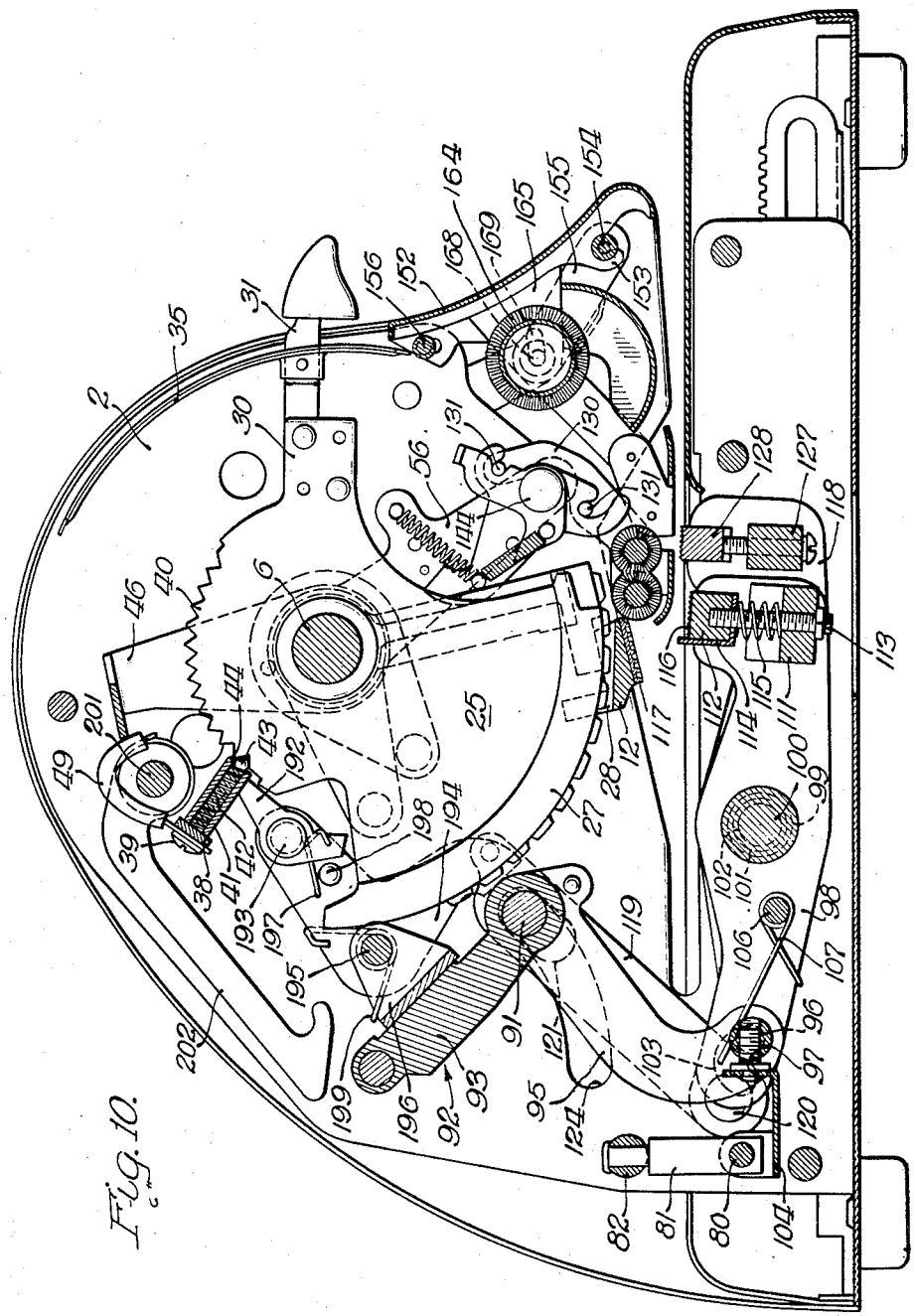

United States Patent Office 2,697,981
Patented Dec. 28, 1954

2,697,981

CHECK WRITING MACHINE

Arthur G. Rindfleisch, Chicago, Ill., assignor to Theodore B. Hirschberg, Jr., Chicago, Ill.

Application August 30, 1950, Serial No. 182,290

16 Claims. (Cl. 101—20)

This invention relates to machines for printing or writing checks and like instruments, commonly termed check writers, and has to do with machines employing independently adjustable printing segments and cooperating platen means for effecting the printing operation.

Check writers of the type above referred to are known and extensively used. It is known in such machines to provide a sliding prefix bar bearing a suitable legend which, in the normal and intended operation of the machine, is printed on or impressed in the check in close proximity to the first digit of the amount of dollars for which the check may be drawn. That avoids leaving a space before the first dollar digit such that, after the check is printed, one or more digits could be inserted thus raising the check above the amount for which it was originally drawn. In the known machines referred to it is possible to perform the printing operation while holding the prefix bar in its outer or inoperative position and the check, after printing, may be reprinted and raised by unscrupulous persons who are quite expert in that line.

My invention is directed to a check writing machine which avoids the above noted objections to the above referred to known check writers. To that end, I provide means whereby a printing operation can not be performed if the prefix bar is held against inward movement and the first dollars printing segment is in its normal non-printing position. If the first dollars printing segment is in printing position, however, the printing operation may be performed, but the prefix bar is then in close proximity to that printing segment and is held thereby against inward movement. I also provide improved clearing and repeat means whereby all of the printing segments are returned to normal or non-printing positions upon completion of a printing operation, in order that the machine may be reset, or clearing may be prevented when it is desired to print a number of checks all for the same amount; at the option of the operator. Further objects and advantages of my invention will appear from the detail description.

In the drawings:

Figure 5 is a sectional view taken substantially on line 5—5 of Figure 4, certain parts being broken away for clearness of illustration;

Figure 6 is a rear view of the prefix bar standard and associated parts, the frame and casing side plates being shown fragmentarily and in section and certain other parts being broken away;

Figure 7 is a front view of the prefix bar standard and associated parts, with certain parts broken away and shown in section;

Figure 8 is a sectional view taken substantially on line 8—8 of Figure 4, with the holding arm of the repeat and clearing means in its normal inoperative or "off" position, the positions of certain parts in effecting a clearing operation after completion of the printing operation being indicated in dot-and-dash lines and in dotted lines;

Figure 9 is a view similar to Figure 8 but with the holding arm of the repeat and clearing means in its operative or "on" position, the positions of the parts as the operating lever approaches the limit of its forward stroke being indicated in dot-and-dash lines;

Figure 10 is a sectional view taken substantially on line 10—10 of Figure 4, certain parts being shown in elevation;

Figure 11 is an underneath or face view of the prefix bar;

Figure 12 is a fragmentary face view of a check printed by the check writer of my invention;

Figure 13 is an inner face view of the casing door and the parts carried thereby;

Figure 14 is a detail view of the latch means for the door of Figure 13, the door being broken away in major portion and shown fragmentarily;

Figure 15 is a sectional view taken substantially on line 15—15 of Figure 13, certain parts being shown in plan; and Figure 16 is a plan view of the right hand portion of the inking tray assembly.

The check writing machine of my present invention is, in general, similar to the check writer disclosed in Patent No. 1,909,141, issued May 16, 1933, to Arthur H. Woodward and William E. Richmond, and the check writer disclosed in Patent No. 2,118,871, issued May 31, 1938, to Ernest H. Thompson, but embodies certain improvements thereover, as will appear more fully later.

The main frame of the machine comprises side plates 1 and 2 of irregular polygonal shape, each of these plates being provided with a forwardly extending base element 3 which defines, with the body portion of the plate, a rearwardly extending slot 4 for insertion of the check or like paper into the machine. These plates are secured together, in spaced relation, by spacing rods 5 suitably secured through the plates.

Figure 1:
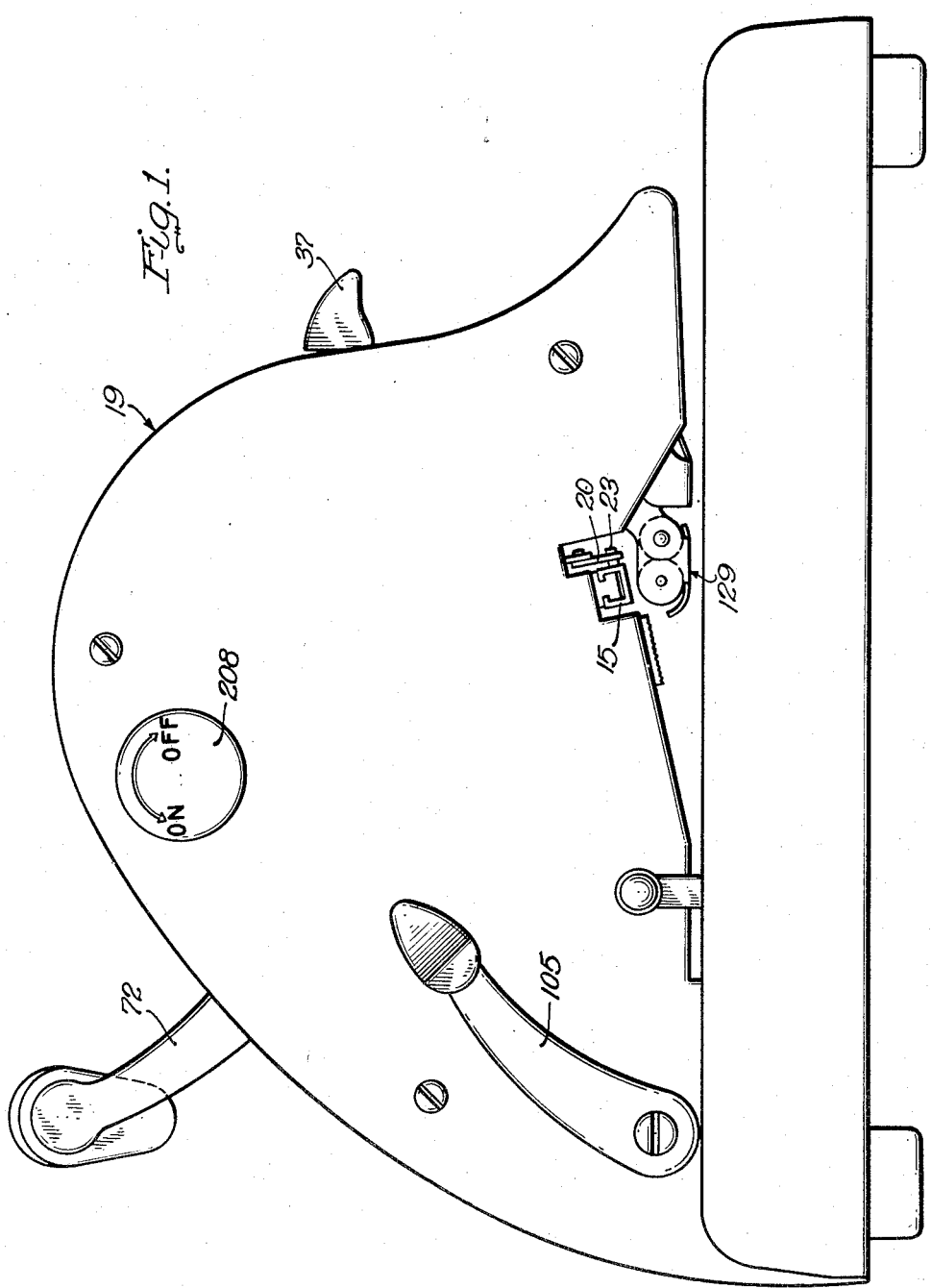
Figure 1 is a left side view of a check writer embodying my invention.

A shaft 6 is rockably mounted in the plates 1 and 2, by means of reduced studs (not shown) formed at the ends of the shaft and providing shoulders which abut the inner faces of the plates and hold the shaft against endwise movement. A "sum" bar 9, a "dollars" bar 10 and a "cents" bar 11 are mounted at their upper ends upon the shaft 6, each of these bars being provided with a sleeve which fits snugly about the shaft. Each of these bars is secured at its lower end to a guide bar 12 which extends transversely of the main frame and has its end portions suitably secured in the plates 1 and 2. The manner of securing the bars 9, 10, and 11 to the guide bar 12 is shown more clearly in Figure 9. Bar 11 is provided with a rearwardly extending lug 13 which is suitably bored and snugly receives the head of a headed stud 14 riveted or otherwise suitably secured through the guide bar 12. The lower ends of bars 9 and 10 are similarly secured to bar 12. The bars 9, 10, and 11 are thus effectively secured in position and held in proper relation to the guide bar 12. The printing line of the machine is the line defined by the bars 9, 10, and 11, and the segments which carry the printing characters are individually adjusted to align such characters on this printing line. Bar 10 bears upon its lower or printing face the abbreviation "Dol's" for dollars, and the bar 11 bears upon its printing face the characters "Cts" constituting the abbreviation for cents. Bar 9 is provided with a prefix plate 15 at the lower end thereof. This plate 15 is of channel cross section and is slidably mounted on the lower end of bar 9, which is of T-cross section, as shown in Figures 1 and 5. Referring more particularly to Figure 7, side plate 1 is provided with a suitable opening 17 aligned with an opening 18 in an enclosing casing 19. That provides means whereby the plate 15 may be inserted into and withdrawn from the lower end of bar 9. Plate 15 is held in position by means of a latch lever 20 pivoted at 20a on the lower end of an arm 21 fixed at its upper end on a pivot pin 21a rockably mounted through the sum bar 9. A tension spring 22, anchored to bar 9 and to the inner end of latch lever 20, holds the notched outer end of the latter normally engaged over a pin 23 projecting forwardly from plate 15. The notch 24 in latch lever 20 is somewhat larger than pin 23, as shown, permitting a limited amount of relative movement or play thereof.

The plate 15 may bear a suitable legend upon the printing face thereof, such as "the sum." As will be noted more clearly from Figure 11, the printing characters upon the printing face of plate 15 are serrated so as to perforate the paper of the check. The printing characters cooperate with a platen which is also provided with serrations upon its active face, which serrations cooperate with the serrations of the printing characters to effectively perforate the paper or material of the check. In this respect, the slight movement or play of the plate 15 is advantageous as permitting of the serrations of the printing characters of the plate being properly aligned with the serrations of the platen, by slight movement of the plate as the platen is brought into full operative relation to the printing characters.

Figure 4:
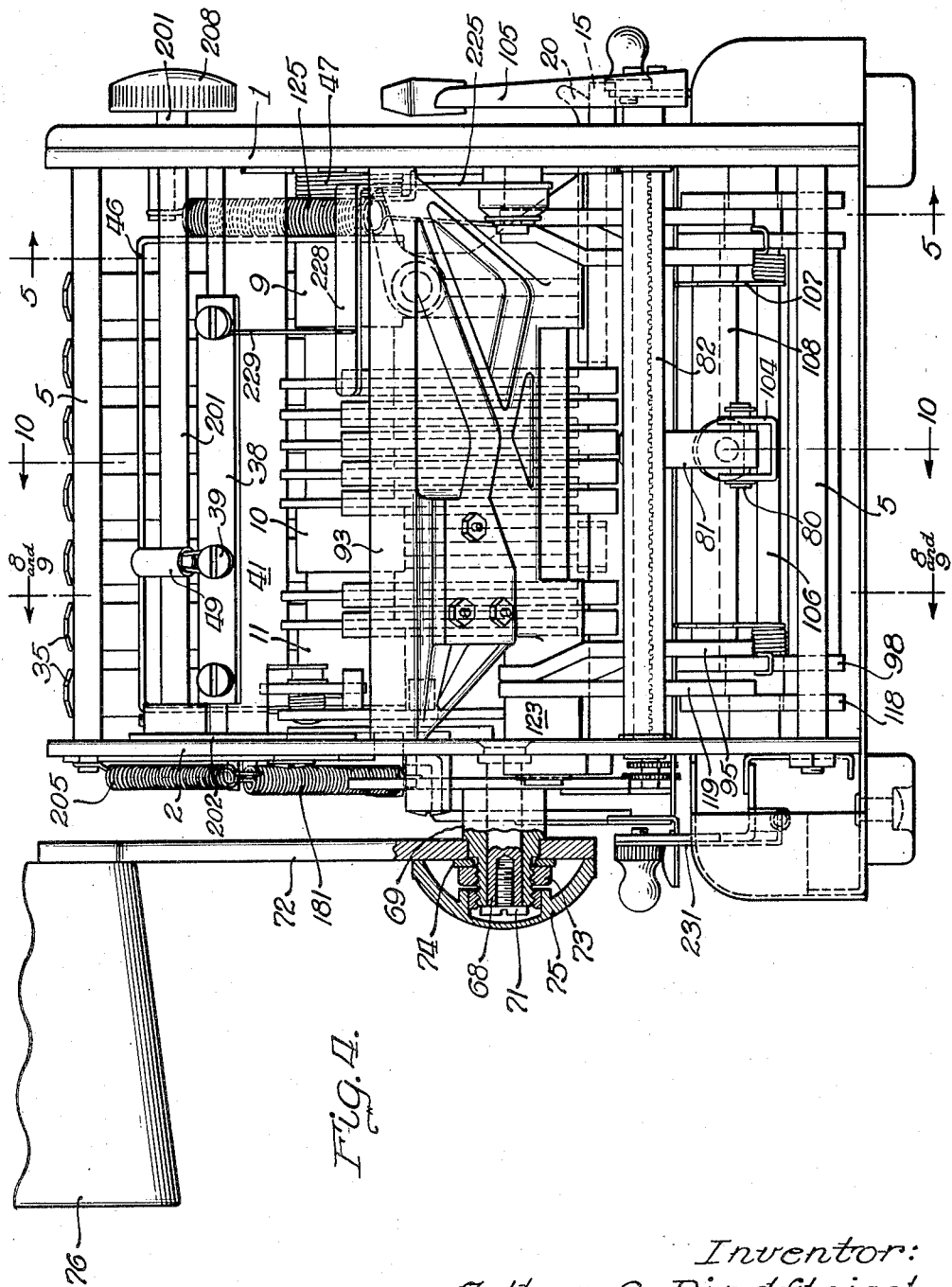
Figure 4 is a back view of the machine of Figure 2.

A plurality of type segments 25 are mounted upon shaft 6 for turning movement thereon, these segments being spaced apart by spacers 26 mounted upon the shaft. We have shown (Figures 2 and 4) five segments between the bars 9 and 10, these segments being held against movement endwise of the shaft by the spacers 26 and the sleeves at the upper ends of bars 9 and 10. Two printing segments 25 are disposed between the sleeves at the upper ends of bars 10 and 11 and are mounted upon the shaft 6 in the same manner as the segments between bars 9 and 10. An arcuate type bar 27 is suitably secured to the edge portion of each segment for movement therewith. This bar is provided, upon its printing face, with a series of characters ranging from zero to nine and arranged in seriatim order, there being a spacing character, such as an asterisk or star, preceding the zero or naught character. Referring more particularly to Figures 8 and 10, the guide bar 12 is provided with a plurality of guide slots 28 extending from front to back thereof, this bar being of approximately L-shape in cross section. These guide slots receive the type bars 27 of the respective segments so as to guide the segments in the movement thereof and hold them against lateral movement. In this connection, it will be noted that the forward edge of the guide bar 12 is disposed adjacent the printing line of the machine, determined by the bars 9, 10 and 11. The characters which are used for printing in a given printing operation are those which are disposed in alignment immediately in front of the forward edge of the guide bar. This is advantageous as assuring that the type characters used in the printing operation are effectively held against any objectionable looseness or play during the printing operation, thus assuring accuracy.

Each segment 25 is provided with a forwardly projecting finger 30 to which is riveted or otherwise suitably secured a grip member 31. Each of these members is suitably shaped and disposed to project through a slot in an index plate (not shown) which is suitably secured over an opening provided in the casing 19. A number strip 35 is suitably secured to member 31. At its outer end, member 31 is provided with a suitable finger grip 37. The strip 35 is disposed concentrically with the shaft 6 and is marked correspondingly to the arrangement of the characters upon the type bar 27. The index plate is provided, adjacent each slot thereof, with a series of characters corresponding to the characters of the type bar 27, but arranged oppositely thereto, and is further provided, adjacent each slot, with an opening for observation of the strip 35 which is disposed to move beneath such opening; as in the above identified patent. The number strips 35 are so disposed that the number or character visible through the opening corresponds to the character of the associated type bar which is disposed upon the printing line of the machine. Also, the grip member 31 is so disposed as to be aligned with that character of the series of characters adjacent that slot of the index plate which corresponds to the character of the type bar which is in position upon the printing line, as in the above mentioned patent. That provides simple and efficient means for accurately determining the set of the respective printing or type segments.

The printing segments 25, being loose upon the shaft 6, are independently adjustable on a common axis for selectively aligning the printing characters of the type bars 27 on the printing line of the machine, this independent adjustment of the segments being accomplished by direct movement thereof through the manual operation of member 31. Each segment 25 is provided with a two-way rack 40 formed by cutting teeth in the hub portion of the segment. An index bar 41 (Figure 10) is suitably secured at its ends in the plates 1 and 2, this bar being disposed in rear of and above the shaft 6. Bar 41 is suitably bored from its lower and forward edge for reception of compression coil springs 42, one of which is shown in Figure 10. Each spring 42 is confined between a detent ball 43, at its lower end, and a strip 38 secured by screws 39 to the top of bar 41. The bar 41 is slotted at 44 for reception of rack 40, and the ball detent 43 engages between the teeth of the rack and provides, therewith, means for yieldingly holding the segment 25 in adjustment. The shoulder at the rearward end of the rack 40 is disposed to contact bar 41 so as to limit turning of segment 25 in a clockwise direction, as considered in Figure 10. The two slots of the index plate at the right hand side thereof are somewhat shorter than the other slots, such that the zero or naught characters of the cents segments are disposed on the printing line when the finger grips 37 of such segments have been moved into their lowermost position; as in the above mentioned patent. That is advantageous since, when the finger grips of all of the segments are in their lowermost position, which is the normal position thereof, the two finger grips of the cents segments are disposed slightly above the finger grips of the dollar segments so as to be distinguished therefrom and reduce liability of confusion between the segments in setting the machine for printing.

After printing operation, all of the segments should be returned to normal position. For this purpose, I provide a clearing yoke 46 of inverted U-shape, the arms of which are loosely mounted upon shaft 6. The inner faces of the arms of the yoke abut the outer end of the sleeve at the upper end of bar 9 and the outer end of the sleeve at the upper end of bar 11, respectively. Referring to Figures 6, 7 and 10, a torsion spring 47 is disposed about shaft 6, adjacent the left arm of clearing yoke 46, with one end extending beneath index bar 41 and its other end anchored through a tab 48 of the adjacent arm of yoke 46. The torsion spring 47 urges the clearing yoke 46 counterclockwise, as viewed in Figure 10, and normally holds it in contact with a cushioned stop 49 conveniently clamped between strip 38 and the head of one of the securing screws 39 therefor. As will be noted more clearly from Figure 2, yoke 46 is provided with a notch 55 in the bight portion thereof disposed for reception of the two grip members of the "cents" segments. By swinging the yoke forwardly and downwardly, after a printing operation, by means to be described later, all of the segments are returned to normal or inoperative position. Movement of segments 25 in a counterclockwise direction, as viewed in Figure 10, is limited by contact of the fingers 30 and grip members 31 thereof with yoke 46.

Two inking arms 56 are rockably mounted on shaft 6 at the inner faces of the side frame plates 1 and 2, as shown more clearly in Figures 5 and 8 to 10, inclusive. Each of the arms 56 is provided with a rearwardly extending finger 57. The finger 57 of arm 56 adjacent the right frame side plate 2 has secured thereto a stud 58 (Figure 9) which projects outwardly through an arcuate slot 59 in side plate 2. The arms 56 carry inking means and are appropriately actuated for inking the type characters at the printing line of the machine, incident to the printing operation, as will be explained more fully later.

A stud shaft 68 is secured in plate 2 and projects outwardly therefrom. A bushing 69 is rotatably mounted on stud shaft 68 and carries a cam 70 secured thereto. A screw 71 threads into the outer end of stud shaft 68 with its head contacting the outer end of bushing 69, which is thus held against endwise movement. The outer end of bushing 69 is slabbed off from opposite sides, to provide flats thereon, and receives the lower end portion of an operating lever 72 fitting tightly thereon. A nut 73 is threaded on the outer end of bushing 69 and seats against a spring washer 74 bearing against the outer face of lever 72, effective for retaining lever 72 on bushing 69. An ornamental cap nut 75 is also threaded on the outer end of bushing 69 and seats against lever 72, for enclosing and concealing the screw 71, nut 73 and washer 74. The lever 72 is provided at its upper end with a suitable handle 76 for convenience in operation. Normally, the cam 70 is in its full line position shown in Figure 3. Stud or pin 58 of finger 57 projects through an appropriately formed slot 77 in cam 70. Upon turning of the cam 70 in counterclockwise direction, as viewed in Figure 3, to printing position, indicated in dotted lines, the inking arms are swung upwardly and forward, for inking the type characters on the printing line of the machine, and upon return of the cam 70 to its normal position inking arms 56 are returned to normal position; as will appear more fully later.

An operating link 89 is pivoted at its forward end, at 90, to cam 70 at the lower forward portion of the inner side thereof. At its rearward end this link 89 is pivoted to pintle 91 of a toggle link structure 92 shown more clearly in Figures 2, 4, 8 and 10. This toggle link structure includes an upper member or leaf 93 which is pivotally mounted, at its upper edge, in plates 1 and 2. Member 93 is provided, at the lower edge and adjacent each end thereof, with spaced sleeves 94 through which the pintle 91 passes. Links 95 are loosely mounted at their upper ends upon pintle 91 adjacent the outer ends of the sleeves 94. At their lower ends these links receive reduced studs 96 formed at the ends of a spacing rod 97. The studs 96 pass through perforator supporting arms 98 which are rockably mounted intermediate their ends upon reduced elements 99 of a shaft 100. Each end portion of this shaft is of stepped formation, and includes three successively reduced elements 99, 101 and 102, the elements 102 being mounted through plates 1 and 2 and supporting the shaft 100 for rocking movement. As will be noted more clearly from Figure 10, each of the arms 98 is provided, adjacent the rear end thereof, with an arcuate slot 103 which is curved forwardly and downwardly of arm 98. The studs 96 pass through slots 103 and the rod 97 is capable of limited forward and rearward movement for adjusting the position of the studs in the slot.

An angle member 104 is suitably secured to the spacer rod 97, intermediate the ends thereof, and projects rearwardly therefrom. Member 104 is pivoted at its outer end, at 80 to the lower end of an arm 81 fixed to, and extending downward from a cross shaft 82 rockably mounted in the frame side plates 1 and 2. Shaft 82 extends through the left side of the casing 19 and has an adjusting lever 105 secured on its outer end. By rocking shaft 82 in proper direction, the rod 97 may be moved from a forward position to a rearward position, and vice versa, as will be clear. A second spacer rod 106 is mounted in the arms 98 adjacent and in rear of shaft 100. Wire springs 107 are mounted about rod 106, one arm of the respective springs engaging beneath the adjacent arm 98. The springs 107 extend rearwardly over rod 97 and bear thereon within grooves extending about the rod circumferentially thereof. When the spacer rod 97 is in its rearward position, studs 96 are disposed at the upper and rearward ends of the slots 103. Under such conditions, when the toggle lever structure is straightened or extended maximum downward movement of the rearward ends of arms 98 will occur, with maximum upward movement of the forward ends of such arms. By moving the rod 97 into its forward position shown in Figure 10, the studs 96 are caused to pass into the forward lower portions of slots 103 thus raising the rearward ends of arms 98 and lowering the forward ends of such arms. Moving rod 97 into its forward position shifts the point of connection between links 95 and arms 98, and raises the rearward ends of these arms to such an extent that when the toggle lever structure is straightened the forward ends of arms 98 will not be raised sufficiently to render active the perforating means carried thereby. This provides simple and efficient means for disabling and enabling the perforating means for perforating the drawee's name on a check or like instrument.

Referring more particularly to Figure 10 a supporting bar 111 is suitably supported between the arms 98 at the forward ends thereof. A perforating bar 112 is adjustably mounted on bar 111 by means of screws 113. Certain of the screws 113 pass through an angle member 114 fitting about the back and the under face of perforating bar 112 and normally projecting a short distance thereabove. Angle member 114 is slidable on screws 113 and normally is held raised by compression openings 115 disposed about screws 113. The upper face of bar 112 is serrated at 116 to provide points or tooth elements which, when bar 112 is raised into its full operative position, pass through perforations in a perforator plate 117 (Figure 10) suitably secured upon the under face of guide bar 12. As bar 112 approaches full raised position, angle member 114 contacts cross bar 12 and thereafter remains stationary in the continued upward movement of perforator bar 112. The bar 112 and the plate 117 thus cooperate to perforate the area of the check corresponding to the drawee's name and, as above noted, by shifting the spacer rod 97 such perforating means can be rendered either operative or inoperative, as desired. The ends of the perforator bar 112 set snugly into guide slots extending from the upper edges of the arms 98, such slots providing means for guiding the bar during adjustment thereof and for holding it against lateral movement.

Platen supporting arms 118 are rockably mounted upon the elements 101 of shaft 100. These arms are connected, at their rearward ends, by links 119 to pintle 91, the lower ends of these links being pivoted at 120 to arms 118. Each of the links 119 is provided, adjacent its upper end, with a slot 121 (Figure 10) which extends lengthwise of the link and receives the pintle 91. In the normal positions of the parts, the pintle is disposed an appreciable distance above the lower ends of the slots, thus providing a lost motion connection between the links and the pintle. This pintle is provided, at the end thereof adjacent side plate 1, with a circumferential groove which receives a lock washer (not shown) of known type, the upper end of link 119 adjacent plate 1 being confined between this washer and the upper end of the adjacent link 95. A spacer roller 123 (Figure 4) is mounted upon the pintle between the upper end of the other link 119 and the side plate 2. Pintle 91 projects through an arcuate slot 124 (Figure 3) through plate 2 and is pivotally connected to the rearward end of link 89 as previously described. A tension spring 125 (Figures 2 and 5) is anchored at its upper end to a stud 126 secured to side plate 1 at the inner face thereof, the lower end of this spring being suitably secured to the upper end of link 119 adjacent this plate. This spring 125 normally holds the rearward ends of arms 118 raised, upward movement thereof being limited by a stud 126a projecting inwardly from side plate 2 (Figure 8) and disposed to be contacted by arm 118 adjacent that plate. A tension spring 108 is anchored at its upper end to a stud 109 secured to side plate 1 at the inner face thereof, the lower end of this spring being anchored to the upper end of link 95 adjacent that plate. This spring 108 provides yielding means for normally holding the toggle lever structure in folded or retracted condition thus normally holding the rearward ends of the arms 98 in raised position and the forward ends of these arms in lower or inoperative position.

A platen supporting bar 127 is suitably secured in the forward ends of arms 118 slightly in advance of bar 111. A platen 128 is adjustably mounted in this bar and in the arms 118 in the same manner as the perforator bar 112 is mounted. The upper face of the platen is serrated and cooperates with the printing characters of the segments and the bars 9, 10 and 11 disposed upon the printing line of the machine, which characters are also serrated as above noted. As will be noted more clearly from Figure 10, with the parts in their normal or inoperative positions, the platen and the perforator bar are disposed below and an appreciable distance from the printing line of the machine, and the perforator plate, respectively. This provides ample room for operation of an inking assembly between the printing characters and the platen and perforator plate.

The inking assembly includes a tray 129 having upwardly and forwardly extending side arms 130 each provided with two spaced apart inwardly projecting pins 131. An inking roller 132 and a transfer roller 133 are rotatably mounted in tray 129 in contact with each other. The rollers 132 and 133 are felt covered and preferably each formed in two lengthwise sections spaced a short distance apart, which sections, in practice, are saturated with differently colored inks, one section being saturated with blue ink and the other section saturated with red ink, for example.

Shaft 134 of inking roller 132 has secured on its right end portion, outwardly beyond arm 130, a collar 135, a spur pinion 136, a ratchet wheel 137 and a second collar 138. The spur pinion 136 meshes with a spur pinion 139 fixed on shaft 140 of the transfer roller 133. The pins 131 of each arm 130 of the inking tray 129 engage into forwardly directed upper and lower slots 141 and 142, respectively, in a mounting plate 143 pivoted by a headed pin 144 on the lower end of inking arm 56. The mounting plate 143 is of generally triangular shape, is urged in clockwise direction, as viewed in Figures 8, 9 and 10—counterclockwise in Figures 3 and 5—by a tension spring 145 anchored thereto and to inking arm 56. Turning of plate 143 by spring 145 is limited by a stop pin 146 carried by arm 56. A latch plate 147 of substantially L-shape is pivoted on pin 144, at the inner face of mounting plate 143. The plate 147 is urged clockwise, Figures 8, 9 and 10—counterclockwise, Figures 3 and 5, by a tension spring 148 anchored thereto and to mounting plate 143. Turning of latch plate 147 by tension spring 148 is limited by a stop pin 149 carried by the mounting plate 143. Latch plate 147 is provided with a forwardly directed notch 150 which receives the upper one of the pins 131. In its normal position, the plate 147 retains the pins 131 of the respective inking tray arms 130 in the upper portions of slots 141 and 142 of the mounting plate 143. The inking tray assembly is thus pivotally mounted on the inking arms 56 for movement therewith and for relative pivotal movement about the common axis of the pivot pins 144. The latch plate 147 is provided, at its upper end, with an inwardly projecting finger 151 for convenience in turning it in opposition to tension spring 148. By swinging latch plate 147 rearward, the upper pin 131 is released thereby permitting downward movement of arm 130 and withdrawal of pins 131 from slots 141 and 142 of mounting plate 143. The ink tray assembly may then readily be removed from the machine, and it may be readily replaced, as will be clear from what has been said.

Access to the inking tray assembly is provided for by a door 152, at the front of casing 19, provided at each side with a downwardly directed hook element 153 which engages into a circumferential groove in a cross rod 154 carried by suitably formed brackets 155 secured to the outer faces of frame side plates 1 and 2 and extending downwardly and forwardly therefrom. Two bolts 156 (Figures 13, 14 and 15) are slidably mounted on door 152 adjacent the top and at the inner face thereof. Extension members 157 are secured on the inner ends of bolts 156 and extend therefrom inward in overlapping relation. Members 157 are provided at their inner ends with oppositely directed flanges 158 connected at their lower ends by a tension spring 159 and held thereby in contact with the opposite sides of an eccentric 160. The eccentric 160 is fixed on a pin 161 rotatably mounted through the door 152 and a guide strip 162 suitably secured to door 152 in spaced relation to the inner face thereof. The outer ends of bolts 156, when projected, engage slots 163 in frame side plates 1 and 2 for holding door 152 closed. A knurled knob 163 is fixed on the outer end of pin 161. By turning knob 163 the bolts 156 may be retracted thus releasing door 152 for opening, or removal, thereof in an obvious manner.

Figure 2:
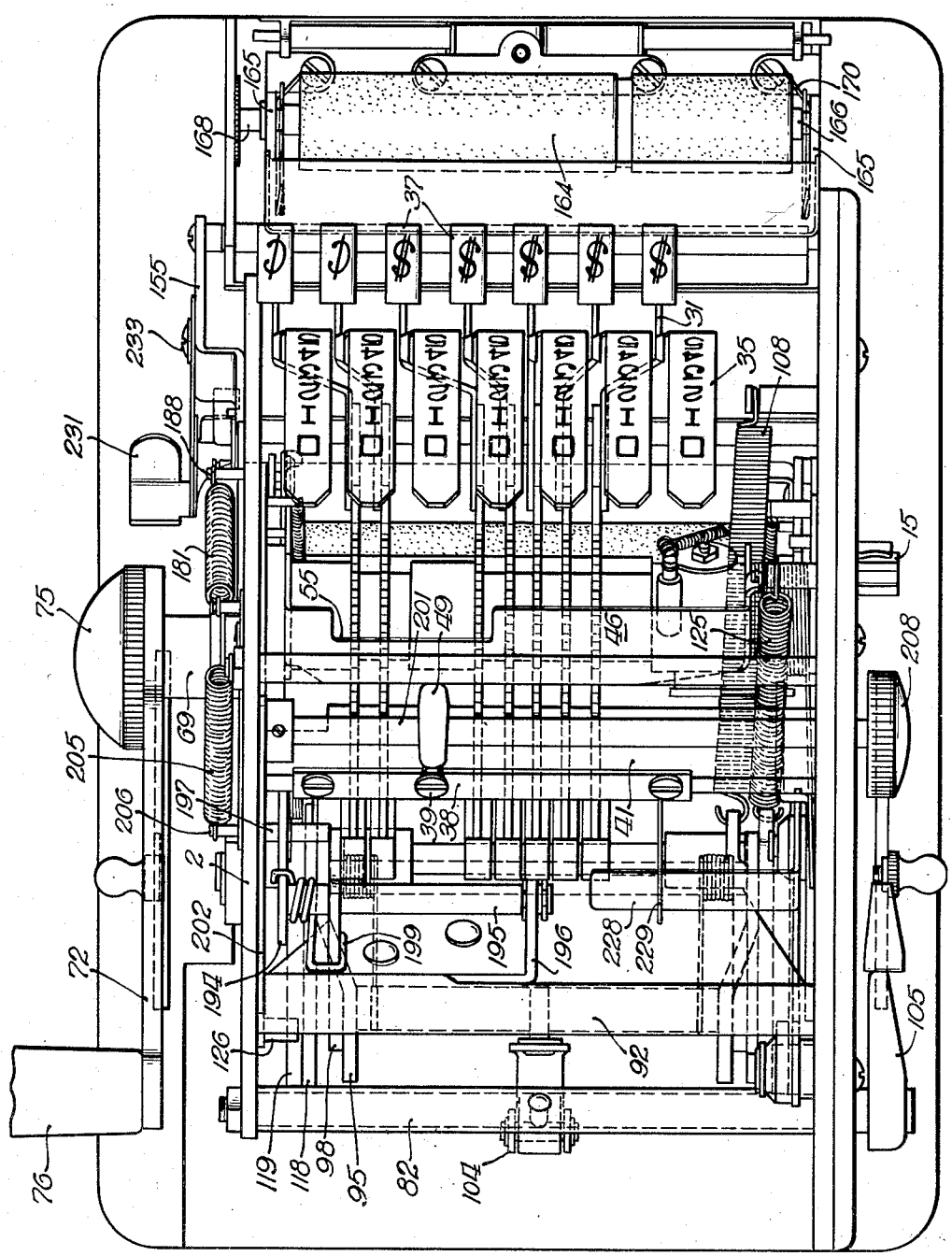
Figure 2 is a plan view of the machine of Figure 1 with the enclosing casing removed except at the base portion of the machine.

An ink supply or fountain roll 164 is rotatably mounted between two arms 165 of door 152 projecting inwardly therefrom. Roll 164 is provided at one end with a stud shaft 166 which extends through a slot 167 in the corresponding arm 165 (Figure 5) and, at its other end, with a stud shaft 168 (Figure 10) which extends through a slot 169 in the other arm 165. Torsion springs 170, shown more clearly in Figures 2 and 13, are appropriately secured to door 152 and bear against the stud shafts 166 and 168 effective for yieldingly holding the fountain roll 164 in its rearward position between the arms 165. The roll 164, like the rollers 132 and 133, is provided with a suitable ink absorbent covering of felt, or other suitable material, is formed in two lengthwise sections, one blue and the other red, and is kept saturated with ink to provide an adequate supply thereof.

Figure 3:
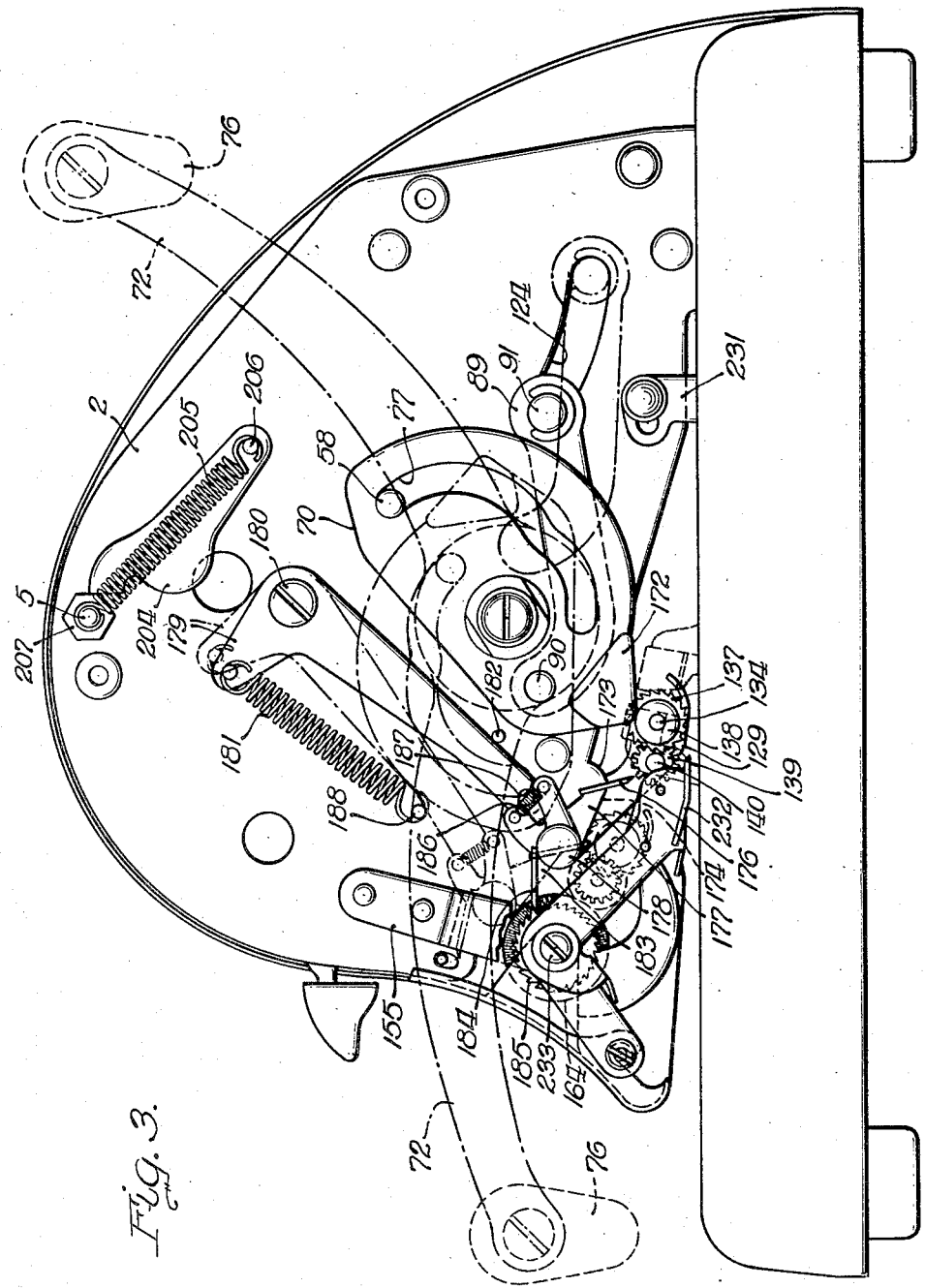
Figure 3 is a right side view of the machine of Figure 1, with the side plate of the casing removed, with the operating lever and associated parts shown in their normal positions in full lines and in the positions which they occupy at the completion of a printing operation in dotted lines.

When the operating lever 72 is in its normal position shown in Figure 3, nose element 172 at the lower forward portion of cam 70 is in contact with collar 138 and holds the inking tray 129 and the rollers carried thereby downward out of contact with the typed characters on the printing line of the machine. In the first portion of the forward movement of operating lever 72, nose element 172 passes out of contact with collar 138 and the mounting plates 143 are then swung upward and rearward by the tension springs 145, bringing the inking roller 132 into contact with the type characters on the printing line. In the continued forward movement of the operating lever 72 the inking arms 56 are swung upward and forward and the inking roller 132 is rolled across the faces of the type characters thereby inking the latter. Shortly thereafter, in the continued forward movement of the operating lever 72, the inner collar 135 on shaft 134 of the inking collar 132 contacts a cam shoulder 173 of the frame side plate 2, thus swinging the inking tray 129 downward and moving the inking roller 132 downward away from the printing segments, collar 135 passing from cam shoulder 173 beneath inclined edge 174 of frame side plate 2. In that manner, the type characters on the printing line are effectively inked and thereafter the inking roller is maintained out of contact with the type segments during the printing operation.

As the collar 135 passes off of the cam shoulder 173, ratchet wheel 137 engages detent element 176 at the rearward end of an angle lever 177 pivoted, by a headed pin 178, on the lower end of a bell crank 179 pivoted, by a shouldered screw 180, on the outer face of frame side plate 2. The bell crank 179 is urged in counterclockwise direction by a tension spring 181 anchored thereto and to frame side plate 2, and normally is held by spring 181 in contact with a stop pin 182 fixed to plate 2. A second angle lever 183 is pivoted on pin 178, between lever 177 and bell crank 179, and carries a detent element 184 which, in the normal position of operating lever 72, engages the ratchet wheel 185 on stud shaft 168 of the fountain roll 164. During the first portion of the upward and forward movement of the inking arms 56, the ratchet wheel 185 is turned a short distance by a detent element 184, thereby turning the fountain roll 164 a corresponding distance in counterclockwise direction, as viewed in Figure 3. That occurs in the first part of the upward and forward movement of the bell crank 179. In that connection, it will be noted that the two angle levers 177 and 183 have their arms connected by a tension spring 186 which normally holds those arms in contact with a stop pin 187 carried by the bell crank 179. As the inking tray 129 is swung upward and forward in the manner previously described, the ratchet wheel 137 engages the detent element 176 and picks up the bell crank 179, detent element 176 being appropriately disposed to that end, swinging it upward and forward and thereby turning ratchet wheel 185 a short distance, in the manner above described. Thereafter, in the continued forward movement of the operating lever 72, detent element 184 passes out of engagement with the ratchet wheel 185, bell crank 179 contacts stop pin 188, to which the lower end of tension spring 181 is anchored, and in the further forward and downward movement of operating lever 72, the transfer roller 133 is moved into contact with the fountain roll 164, by continued forward and upward movement of the inking arms 56, and the ratchet wheel 137 is turned a short distance in clockwise direction, as viewed in Figure 3, by movement thereof relative to detent element 176 which is now stationary. This turning of ratchet wheel 137 turns the inking roller 133 and, also, by means of the pinions 136 and 139, turns the transfer roller 133 in contact with the fountain roll 164. In that manner, the transfer roll receives ink from the fountain roll and transfers this ink to the inking roller, and the inking roller is turned a short distance after each printing operation so as to present a new inking surface to the type characters on the printing line of the machine. Upon completion of the printing operation, the operating lever 72 is returned to its normal position shown in Figure 3, and the inking tray 129, bell crank 179 and associated parts are returned to their normal positions shown therein.

The clearing yoke 46 normally is held in its position shown, in contact with stop 49, in the manner previously described. An arm 190 is secured to the right arm of clearing yoke 46 and extends downward and rearward therefrom. A trip pin 191 is secured in the lower end of arm 190 and projects inward therefrom. This pin 191 is disposed, under certain conditions, for engagement, by a trip pawl 192 pivoted, by a headed pin 193, on a bell crank 194 adjacent the inner face of frame side plate 2 and fixed on one end of a stub shaft 195 rockably mounted in a U bracket 196 fixed to the forward face of leaf 93 of the toggle 92. The trip pawl 192 is urged in clockwise direction, as viewed in Figure 9, by a torsion spring 197 and is normally held thereby in contact with a stop pin 198 secured in the forward arm of bell crank 194. The bell crank 194 is urged in clockwise direction by a torsion spring 199 and normally is held thereby in its position shown in Figure 9, with one arm in contact with the roller 123 on the adjacent end of the pintle rod 91 of the toggle 92.

A cross rod 201 is rockably mounted in the frame side plates 1 and 2, a short distance above the index bar 41. A holding arm 202 is fixed on rod 201 at the inner face of frame side plate 2. This arm 202 is provided, at the rearward end thereof, with a hook 203 which, in the lowered position of arm 202 shown in Figure 9, is disposed to engage the outer end portion of pin 198, which projects beyond the outer face of the upper arm of bell crank 194, the purpose of which will appear more fully presently. When the arm 202 is in its raised position shown in Figure 8, the pin 198 will clear hook 203, as will be obvious. Referring more particularly to Figures 1 and 3, an adjusting arm 204 is fixed upon the outer end of cross rod 201, at the outer face of the frame side plate 2. A tension spring 205 is anchored at one end to the rearward end of arm 204, at 206, and has its upper end anchored to the adjacent spacer rod 5. The spring 205 is an over-center spring effective for holding arm 204 in position with its upper end in contact with a nut 207 threaded on the spacer rod 5, or in a second position with its upper or forward end spaced away from the nut 207. A knurled knob 208 is secured on the other end of the cross rod 201 (Figure 1) at the left hand side of casing 19, and bears the legends "on" and "off". Turning of the knob 208 in counterclockwise direction, as viewed in Figure 1, moves the holding arm 202 from its "off" shown in Figures 8 and 10 to its "on" position shown in Figure 9, in contact with pin 198, in which position it is held by the tension spring 205. By turning the knob 208 clockwise, as viewed in Figure 1, the arm 202 is moved to its "off" position in which it is held by the tension spring 205 as above described.

When the operating lever 72 is swung downward and forward for performing the printing operation, the toggle 92 is extended and the toggle leaf 93 is swung downward and rearward, carrying with it the bell crank 194. If the arm 202 is then in its inoperative or off position shown in Figures 8 and 10, as the toggle 92 is straightened in the printing operation, the trip pawl 192 will pass beneath pin 191 as the printing operation is performed. This will be understood from Figure 8 in which the position of the trip pawl 192 and associated parts shortly before the toggle 92 is straightened are indicated in dot and dash lines. In the return movement of the operating lever 72, the toggle 92 is returned to its fully folded condition shown in Figure 10 and the trip pawl 192 picks up pin 191 thereby swinging the clearing yoke 46 in clockwise direction, as viewed in Figures 8 and 10, effective for returning the printing segments 25 to their normal or non-printing positions, in which the fingers 30 thereof are disposed substantially horizontally, as shown in Figure 10. In that manner, after each printing operation the machine is automatically cleared and may be reset for printing a succeeding check. In cases where it is desired to print a number of checks all for the same amount it is desirable that the automatic clearing means be disabled, in order that necessity for setting the machine for each check may be avoided. That is accomplished by turning the cross rod 201 so as to move the arm 202 to its lowered or on position shown in Figure 9. In the "on" position of holding arm 202 the hook 203 thereof engages pin 198 so as to limit movement of the bell crank 194 and thereby prevent passage of trip pawl 192 below pin 191. In Figure 9 the positions of the trip pawl 192 and associated parts when pin 198 engages hook 203 are indicated in dot and dash lines. It will be noted that the trip pawl 192 is retained in position above pin 191, torsion spring 199 permitting rocking movement of bell crank 194 with its shaft 195 to accommodate the continued movement of the leaf 93 of toggle 92. By preventing passage of trip pawl 192 below the pin 191 in the manner stated, I prevent actuation of the clearing yoke 46 during the rearward or return stroke of the operating lever 72, so that the machine is not cleared and the printing segments 25 remain in their set positions. That condition obtains so long as the holding arms 202 remains in its lowered or on position, so that any desired number of checks, all for the same amount, may be printed successively without necessity for resetting the machine. By moving the arm 202 to its off position, the machine will be automatically cleared at the end of a printing operation in the manner above described.

The first, second, third and fourth dollars segments 25 are provided with notches 210 which, in the normal or non-printing positions of those four segments, are aligned with the prefix plate 15. When the fifth or right hand dollars segment 25 is in its normal position the zero type thereof is on the printing line of the machine, and that is true also of the two cents printing segments.

Referring more particularly to Figures 5, 6, and 7, arm 21 is urged in counterclockwise direction, as viewed in Figure 7, by a tension spring 211 anchored thereto and to an upwardly extending finger 212 of the sum bar 9. This spring 211 tends to move the prefix plate 15 inward along the lower end of the sum bar 9, as will be clear. An arm 213 is fixed on the rearward end of the pivot pin 21a and overlies the forward arm 214 of a lever 215 pivoted on a stud 216 secured to and extending from the left frame side plate 71. The rearward extending arm 217 of lever 215 is provided with a hook element 218 at its rearward end, and is further provided with a downwardly and rearwardly extending finger 219 the rearward end portion of which is substantially reduced in width to provide an inclined shoulder or cam element 220.

The left hand end portion of pintle rod 91 of the toggle 92 extends through an arcuate slot 221 in frame side plate 1. A roller 222 is mounted on pintle 91 and underlies arm 217 of lever 215. In the normal collapsed or folded condition of the toggle 92, roller 222 is disposed at the juncture of finger 219 with arm 217 and the lever 215 is held against turning movement. In the printing operation, if the first or left hand dollars segment 25 is in non-printing position, tension spring 211 swings arm 21 counterclockwise, as viewed in Figure 7, thus moving the prefix plate 15 inward into contact with the first dollars printing segment 25 which is in printing position. If the first, second, third and fourth of the dollars segments 25 are in non-printing position, the prefix plate 15 will be moved inward until its inner end contacts the side of the fifth dollars segment 25. In the printing operation, the prefix plate 15 impresses in the check or like instrument the words "the sum" immediately adjacent the first digit of the amount of dollars for which the check may be drawn. If the check is drawn for a certain amount of cents only, the fifth dollars segment 25 will be in zero position and will print a zero on the check, immediately adjacent which the words "the sum" will be impressed by the prefix plate 15. In the inward movement of the prefix plate 15 by tension spring 211, arm 213 will be turned in clockwise direction, as viewed in Figure 6, and will turn the lever 215 in counterclockwise direction, as viewed in Figure 5, to its dotted line position of this figure. That raises the hook element 218 of arm 217 so as to clear roller 222, thus permitting completion of the printing operation. If, however, the prefix plate 15 is held against inward movement, under the conditions stated, the lever 215 will remain in its position shown in full lines in Figure 5 and the hook element 218 will then engage roller 222, thus preventing completion of the printing operation. In that manner, I guard against printing of a check while the prefix plate is held against inward movement and the first or left hand dollars segment 25 is in its normal non-printing position.

An arm 225 is pivoted at its rearward end on a stud 226 secured to frame side plate 1 and projecting inward therefrom. The forward end of arm 225 rests on an offset or shoulder 227 bent in the forward arm 214 of lever 215. The arm 225 is provided with a finger 228 extending inwardly therefrom and overlying the first or left hand dollars printing segment 25 of the machine. That printing segment when in its normal non-printing position restrains arm 225 against downward movement. A wire spring 229 is anchored at its upper end to strip 38 by one of the screws 39 and bears at its lower end on finger 228, urging arm 225 downward. If the first dollars segment 25 is moved to printing position it then becomes effective for holding the prefix plate 15 against inward movement, due to the fact that the inner end of plate 15 normally is disposed to contact the side of the first printing segment 25, as above noted. Since the prefix plate 15 is then restrained against inward movement, arm 213 is then ineffective for actuating the lever 215, as will be clear from what has been said. However, upon movement of the first printing segment 25 to printing position, the finger 228 of arm 225 is released and this arm is then swung downward by the wire spring 229, thus turning lever 215 counterclockwise, as viewed in Figure 5, to its dotted line position as shown, permitting completion of the printing operation in the manner previously described. I thus provide means whereby the machine is disabled for printing whenever the prefix plate 15 is held against inward movement with the first or left hand printing segment 25 in its normal non-printing position, and is enabled for printing when the prefix plate is not held against inward movement and the first printing segment is in its normal non-printing position and when the first printing segment is in its printing position. Inward movement of the prefix plate 15 is controlled by lever 215 and pintle rod 91, and prefix plate 15 is returned to its normal outer position by pintle rod 91, in cooperation with lever 215 and finger 219 thereof, during the return stroke of operating lever 72, as will be clear from what has been said.

Suitable check stops 231 are provided for limiting the extent of insertion of the check into the machine, as is known. I also provide a printing line indicator 232 of suitable type pivoted at each side, by a pivot screw 233, to bracket 155 previously mentioned.

As will be understood, changes in detail may be resorted to without departing from the field and scope of my invention, and I intend to include all such variations, as fall within the scope of the appended claims, in this application in which the preferred form only of my invention has been disclosed.

I claim:

1. In a check writing machine, a plurality of dollars printing segments respectively having a normal position and moveable therefrom to a printing position, operating means for effecting the printing operation, a prefix plate normally disposed adjacent the outer side of the first segment, the respective segments when in said normal position being disposed to clear said prefix plate for inward movement thereof and when in said printing position being disposed to limit inward movement of said prefix plate, means effective for moving said plate inward to the extent limited by the nearest one of the other of said segments in printing position with said first segment in normal position, and means controlled by said moving means effective for disabling said operating means when said prefix plate is held in its said normal position with said first segment in its said normal position.

2. In a check writing machine, a plurality of dollars printing segments respectively having a normal position and movable therefrom to a printing position, operating means for effecting the printing operation, a prefix plate normally disposed adjacent the outer side of the first segment, the respective segments when in said normal position being disposed to clear said prefix plate for inward movement thereof and when in said printing position being disposed to limit inward movement of said prefix plate, yielding means effective for moving said plate inward to the extent limited by the nearest one of the other of said segments in printing position with said first segment in normal position, and means actuated by said yielding means effective for disabling said operating means when said prefix plate is held in its said normal position with said first segment in its said normal position.

3. In a check writing machine, a plurality of dollars printing segments respectively having a normal position and movable therefrom to a printing position, operating means for effecting the printing operation, a prefix plate normally disposed adjacent the outer side of the first segment, the respective segments when in said normal position being disposed to clear said prefix plate for inward movement thereof and when in said printing position being disposed to limit inward movement of said prefix plate, yielding means effective for moving said plate inward to the extent limited by the nearest one of the other of said segments in printing position with said first segment in normal position, means effective for disabling said operating means when said prefix plate is held in its said normal position with said first segment in its said normal position, and means for rendering said disabling means ineffective responsive to movement of said first segment to printing position.

4. In a check writing machine, a plurality of dollars printing segments respectively having a normal position and movable therefrom to a printing position, operating means for effecting the printing operation, a prefix plate normally disposed adjacent the outer side of the first segment, the respective segments when in said normal position being disposed to clear said prefix plate for inward movement thereof and when in said printing position being disposed to limit inward movement of said prefix plate, yielding means effective for moving said plate inward to the extent limited by the nearest one of the other of said segments in printing position with said first segment in normal position, means actuated by said operating means controlling inward movement of said prefix plate, and means actuated by said yielding means effective for disabling said operating means when said prefix plate is held in its said normal position with said first segment in its said normal position.

5. In a check writing machine, a plurality of dollars printing segments respectively having a normal position and movable therefrom to a printing position, operating means for effecting the printing operation, a prefix plate normally disposed adjacent the outer side of the first segment, the respective segments when in said normal position being disposed to clear said prefix plate for inward movement thereof and when in said printing position being disposed to limit inward movement of said prefix plate, yielding means effective for moving said plate inward to the extent limited by the nearest one of the other of said segments in printing position with said first segment in normal position, means actuated by said operating means controlling inward movement of said prefix plate and effective for returning the latter to normal position after completion of the printing operation, and means actuated by said yielding means effective for disabling said operating means when said prefix plate is held in its said normal position with said first segment in its said normal position.

6. In a check writing machine, a plurality of dollars printing segments respectively having a normal position and movable therefrom to a printing position, operating means for effecting the printing operation, a prefix plate normally disposed adjacent the outer side of the first segment, the respective segments when in said normal position being disposed to clear said prefix plate for inward movement thereof and when in said printing position being disposed to limit inward movement of said prefix plate, yielding means effective for moving said plate inward to the extent limited by the nearest one of the other of said segments in printing position with said first segment in normal position, means actuated by said operating means controlling inward movement of said prefix plate, means effective for disabling said operating means when said prefix plate is held in its said normal position with said first segment in its said normal position, and means for rendering said disabling means ineffective responsive to movement of said first segment to printing position.

7. In a check writing machine, a plurality of dollars printing segments respectively having a normal position and movable therefrom to a printing position, operating means for effecting the printing operation, a prefix plate normally disposed adjacent the outer side of the first segment, the respective segments when in said normal position being disposed to clear said prefix plate for inward movement thereof and when in said printing position being disposed to limit inward movement of said prefix plate, yielding means effective for moving said plate inward to the extent limited by the nearest one of the other of said segments in printing position with said first segment in normal position, means actuated by said operating means controlling inward movement of said prefix plate and effective for returning the latter to normal position after completion of the printing operation, means effective for disabling said operating means when said prefix plate is held in its said normal position with said first segment in its said normal position, and means for rendering said disabling means ineffective responsive to movement of said first segment to printing position.

8. In a check writing machine, a sum bar, a plurality of dollars printing segments disposed inwardly of said sum bar respectively having a normal position and movable therefrom to a printing position, operating means for effecting the printing operation comprising a member normally in one position and movable therefrom to a second position and means for moving said member from normal position to said second position and returning it to normal position, a prefix plate slidable on said sum bar and normally disposed adjacent the outer side of the first segment, the respective segments when in normal position being disposed to clear said prefix plate for inward movement thereof and when in printing position being disposed to limit inward movement of said prefix plate, an arm pivoted on said sum bar and connected to said plate for moving it inward and outward, means yieldingly urging said arm in a direction to move said plate inward, interlock means cooperating with said member for releasing said arm for movement in said one direction during movement of said member from its normal position when said prefix plate is otherwise free for inward movement and effective for locking said member against movement to its said second position when said prefix plate is held in its normal position with the first dollars segment in normal position and a dollars segment inward from said first segment in printing position, and means controlled by said first segment for disabling said interlock means when said first segment is in printing position.

9. In a check writing machine, a sum bar, a plurality of dollars printing segments disposed inwardly of said bar respectively having a normal position and movable therefrom to a printing position, operating means for effecting the printing operation comprising a toggle and means for extending and collapsing it, said toggle having a member projecting to one side of it normally in one position and movable therefrom to a second position when said toggle is fully extended for printing, a prefix plate slidable on said sum bar, said printing segments when in normal position being disposed for movement thereacross of said plate and when in printing position being disposed to limit inward movement of said plate, a prefix plate operating arm pivoted on said bar, means yieldingly urging said arm in a direction to move said plate inward, a locking lever having a first arm extending toward said toggle member and a second arm and a finger extending therefrom defining therewith a slot receiving said toggle member, said second arm having an element disposed to engage said toggle member and lock it against movement to its said second position when said locking lever is in operative position, said lever normally being in operative position, means actuated by turning of said prefix plate operating arm for moving said locking lever to inoperative position, and means controlled by the first of said segments for moving said locking lever to inoperative position when said first segment is moved to a printing position.

10. In a check writing machine, a sum bar, a plurality of dollars printing segments disposed inwardly of said bar respectively having a normal position and movable therefrom to a printing position, operating means for effecting the printing operation comprising a toggle and means for extending and collapsing it, said toggle having a pintle pin projecting beyond one side thereof, a prefix plate slidable on said sum bar, said printing segments when in normal position being disposed for movement thereacross of said plate and when in printing position being disposed to limit inward movement of said plate, a prefix plate operating arm fixed on the forward end of a pivot pin mounted on said bar, means yieldingly urging said arm in a direction to move said plate inward, a locking lever having a first forwardly extending arm and a second rearwardly extending arm with a finger extending therefrom defining therewith a slot receiving said pintle pin, said second arm having a hook element disposed to engage said pintel pin and lock said toggle against extension when said locking lever is in operative position, an arm fixed on the rearward end of said pivot pin disposed to engage said forward arm of said locking lever and move the latter to inoperative position when said prefix plate moves inward, a release arm yieldingly urged toward said locking lever, and means cooperating with the first of said segments for holding said release arm in inoperative position when said first segment is in normal position and releasing it for movement to operative position when said first segment is moved to a printing position, said release arm when in operative position being disposed to engage said locking lever and hold it in inoperative position.

11. In a check writing machine, a sum bar, a plurality of dollars printing segments disposed inwardly of said bar, a prefix plate slidable on said bar, a prefix plate operating arm pivoted on said bar, a pin projecting from said plate, and a latch lever pivoted on said arm yieldingly held in engagement with said pin and providing therewith operating connection between said plate and arm.

12. In a check writing machine, a sum bar, a plurality of dollars printing segments disposed inwardly of said bar, a prefix plate slidably mounted on the lower end of said bar by tongue and groove connection thereto, a pin projecting forwardly from said plate, and a latch lever having a downwardly opening notch engaging over said pin and yieldingly held in engagement therewith and providing with said pin operating connection between said plate and arm.

13. In a check writing machine, a plurality of individually adjustable printing segments having a predetermined normal position and provided with adjusting projections, a rockably mounted clearing yoke having limited movement and yieldingly urged in one direction, said yoke being disposed to engage said projections and return said segments to normal position in its movement in the opposite direction, operating means comprising a toggle and an operating lever connected thereto having a printing stroke and a return stroke, said toggle having a leaf movable away from and toward said yoke in the printing stroke and the return stroke respectively of said lever, a mounting member on said leaf yieldingly held in operative position and movable to an inoperative position, an abutment on said yoke, a trip pawl on said member disposed to engage said abutment and swing said yoke in said opposite direction and then release it in the return stroke of said lever, when said mounting member is in operative position, movement of said mounting member to inoperative position disposing said pawl to clear said abutment, and means for optionally moving said mounting member to inoperative position.

14. In a check writing machine, a plurality of printing segments individually adjustable about a common axis and normally in a predetermined angular position relative thereto, adjusting members rigid with and projecting outwardly and forwardly from said segments, a clearing yoke rockable about said axis, yielding means normally holding said yoke in non-clearing position, operating means comprising a toggle and an operating lever connected thereto having a printing stroke and a return stroke, said toggle having a member movable away from and toward said yoke in the printing stroke and the return stroke respectively of said lever, an abutment on said yoke, a trip pawl on said toggle member yieldingly held in an operative position and movable to an inoperative position, said pawl when in operative position being disposed to engage said abutment and swing said yoke in clearing direction and then release it in the return stroke of said lever, said pawl when in inoperative position being disposed to clear said abutment, and means for optionally holding said pawl in inoperative position.

15. In a check writing machine, a plurality of printing segments individually adjustable about a common axis and normally in a predetermined angular position relative thereto, adjusting members rigid with and projecting outwardly and forwardly from said segments, a clearing yoke rockable about said axis, yielding means normally holding said yoke in non-clearing position, operating means comprising a toggle and an operating lever connected thereto having a printing stroke and a return stroke, said toggle having a leaf movable away from and toward said yoke in the printing stroke and the return stroke respectively of said lever, a mounting member on said leaf movable relative thereto to an operative position and an inoperative position, an abutment on said lever, a trip pawl on said mounting member disposed to engage said abutment and swing said yoke in clearing direction and then release it in the return stroke of said lever, when said mounting member is in operative position, said pawl being disposed to clear said abutment when said mounting member is in inoperative position, and means for optionally holding said mounting member in inoperative position.

16. In a check writing mechine, a plurality of printing segments individually adjustable about a common axis and normally in a predetermined angular position relative thereto, adjusting members rigid with and projecting outwardly and forwardly from said segments, a clearing yoke rockable about said axis, yielding means normally holding said yoke in non-clearing position, operating means comprising a toggle in back of said yoke and an operating lever connected thereto having a printing stroke and a return stroke, said toggle having a leaf movable away from and toward said yoke in the printing stroke and the return stroke respectively of said lever, an operating arm rigid with and projecting downward and rearward from said yoke at one side thereof, an abutment fixed to said arm projecting from one side thereof, a mounting member pivoted on said leaf yieldingly held in an operative position and movable relative to said leaf to an inoperative position, a trip pawl on said mounting member disposed to engage beneath said abutment and swing said yoke in clearing direction and then release it in the return stroke of said lever, when said mounting member is in operative position, said pawl being disposed to clear said abutment when said mounting member is in inoperative position, a pin fixed to said mounting member projecting to one side thereof, and a holding arm movable to an operative position in which it engages said last mentioned pin and is then effective for holding said mounting member in inoperative position and an inoperative position in which it clears said last mentioned pin.

References Cited in the file of this patent

UNITED STATES PATENTS

| Number | Name | Date |
|---|---|---|
| Re. 19,484 | Bohrer et al. | Mar. 5, 1935 |
| 907,854 | Mutschler | Dec. 29, 1908 |
| 1,442,059 | Engstrom | Jan. 16, 1923 |
| 1,796,187 | Bohrer | Mar. 10, 1931 |
| 1,909,141 | Woodward et al. | May 16, 1933 |
| 1,984,706 | Slettevold | Dec. 18, 1934 |
| 2,088,789 | Hedman et al. | Aug. 3, 1937 |
| 2,092,852 | Payne | Sept. 14, 1937 |
| 2,111,057 | Swanson | Mar. 15, 1938 |
| 2,118,871 | Thompson | May 31, 1938 |
| 2,180,446 | Welter | Nov. 20, 1939 |
| 2,231,237 | Welter | Feb. 11, 1941 |
| 2,329,646 | Payne | Sept. 14, 1943 |
| 2,346,603 | Payne | Apr. 11, 1944 |
| 2,443,939 | Wells | June 22, 1948 |